(12) United States Patent
Oldrup et al.

(10) Patent No.: US 12,108,772 B2
(45) Date of Patent: Oct. 8, 2024

(54) METHOD AND SYSTEM FOR RECOVERY OF AROMA FROM COFFEE EXTRACTS

(71) Applicant: GEA Process Engineering A/S, Søborg (DK)

(72) Inventors: Jesper Oldrup, Søborg (DK); Preben Dam, Søborg (DK)

(73) Assignee: GEA Process Engineering A/S, Søborg (DK)

( * ) Notice: Subject to any disclaimer, the term of this patent is extended or adjusted under 35 U.S.C. 154(b) by 0 days.

(21) Appl. No.: 18/279,351

(22) PCT Filed: Mar. 9, 2021

(86) PCT No.: PCT/DK2021/050073
§ 371 (c)(1),
(2) Date: Aug. 29, 2023

(87) PCT Pub. No.: WO2022/188933
PCT Pub. Date: Sep. 15, 2022

(65) Prior Publication Data
US 2024/0260602 A1     Aug. 8, 2024

(51) Int. Cl.
*A23F 5/32* (2006.01)
*A23F 5/34* (2006.01)
*A23F 5/36* (2006.01)
*A23F 5/50* (2006.01)

(52) U.S. Cl.
CPC .............. *A23F 5/505* (2013.01); *A23F 5/32* (2013.01); *A23F 5/34* (2013.01); *A23F 5/36* (2013.01)

(58) Field of Classification Search
CPC ...... A23F 5/32; A23F 5/34; A23F 5/36; A23F 5/505
See application file for complete search history.

(56) References Cited

U.S. PATENT DOCUMENTS

| | | | |
|---|---|---|---|
| 3,469,617 A | 9/1969 | Palmason | |
| 3,620,776 A | 11/1971 | Mishkin et al. | |
| 5,222,364 A * | 6/1993 | Carns | A23F 5/486 62/538 |
| 6,149,957 A * | 11/2000 | Mandralis | A23F 5/486 426/387 |
| 2004/0026800 A1 | 2/2004 | Sotoyama et al. | |

FOREIGN PATENT DOCUMENTS

| | | |
|---|---|---|
| CA | 781414 A | 3/1968 |
| EP | 0240067 A2 | 10/1987 |
| EP | 0240754 A2 | 10/1987 |
| EP | 0326740 A1 | 8/1989 |
| GB | 1563230 A | 3/1980 |

OTHER PUBLICATIONS

"Bete Spray dry Manual", BETEFog Nozzle, Inc., Jan. 1, 2005, p. 1-25.

* cited by examiner

*Primary Examiner* — Anthony J Weier
(74) *Attorney, Agent, or Firm* — Flaster Greenberg P.C.

(57) ABSTRACT

A method and a system for recovering aroma compounds from a coffee extract is provided. The coffee extract and a steam flow is provided to a two-fluid nozzle, to generate a spray of coffee extract in steam, which spray is separated to provide an aroma rich gas and stripped coffee extract.

20 Claims, 5 Drawing Sheets

METHOD AND SYSTEM FOR RECOVERY OF AROMA FROM COFFEE EXTRACTS

CROSS-REFERENCE TO RELATED APPLICATIONS

This application is the 371 National Stage of International Application No. PCT/DK2021/050073, filed Mar. 9, 2021, the disclosures of which are incorporated herein by reference in their entirety.

FIELD OF THE INVENTION

The present invention relates to the recovery of aroma compounds from coffee extracts.

BACKGROUND

Soluble coffee products are used to prepare coffee beverages and is enjoyed all over the world. Soluble coffee is also known as instant coffee. The production of soluble coffee products starts with green coffee beans which are roasted to provide both flavour and aroma. Subsequently the roasted coffee beans are milled and extracted with water to produce coffee extract. The coffee extract is then processed into soluble coffee products typically by freeze drying or spray drying, typically following a concentration of the coffee extract by evaporation. The coffee flavour and aroma are important parts of the final soluble coffee product and a lack thereof adversely affects the commercial viability of the product. Coffee aroma is a complex collection of several organic compounds which provide the aroma of coffee. However, a number of these compounds are both volatile and fragile, i.e. may be decomposed or otherwise lost when exposed to high temperatures. Therefore, a number of steps in the production process can lead to loss of aroma compounds, such as evaporation steps where elevated temperatures and/or vacuum conditions are typically used. Hence, it is common to recover aroma during production to subsequently reincorporate the recovered aroma into the product at latter production steps or into the final soluble coffee product. A number of strategies for recovering coffee aroma or maintaining aroma during production exist, such as producing coffee extracts with a high solid content by e.g. counter-current extraction techniques, reducing the need for concentration by evaporation; cut-back techniques, where a small amount of high concentration aroma extract is added to the extract after concentration by evaporation; steam stripping of coffee aroma from the coffee beans and adding the condensate thereof to the soluble coffee product; and recovering aroma by stripping it from liquid coffee extract before evaporation and adding it to the evaporator concentrate or final soluble coffee product. The present invention relates to such stripping of aroma compounds from liquid coffee extracts.

One known method of stripping coffee extract is described in EP0240067, where a coffee extract with a temperature of 100° C. is flashed into a vacuum chamber at 20 torr (approximately 0.03 bar), generating a vapor phase which is then condensed by cooling. The resulting condensate may then be blended back into a concentrate of the stripped coffee. The amount of vapor which it is possible to generate in such a process is limited by the temperatures and pressures of the extract and in the vacuum chamber as higher extract temperature adversely affects the aroma of the coffee, which in turn limits the amount of aroma compounds which are recovered from the extract. Further, the more volatile compounds, which are thus difficult to condense, may be lost through the vacuum pump. The use of a vacuum further poses a high utility demand on the process.

Another method for stripping volatile substances is disclosed in U.S. Pat. No. 3,469,617, where a feed to be stripped is injected into a gaseous stream line in which a rapidly flowing gaseous stream flows, to form a turbulent multiphase flow which is conveyed through a tortuous path, in which tortuous path substantially all stripping is done, and exiting the multiphase flow from the tortuous path to a separator to separate the liquid and gas. Such a method has the advantage of having large contact area between gas and liquid in the turbulent flow. However, the method requires the use of a tortuous path, designed to maintain turbulence and entrainment of liquid and cause further fragmentation of the liquid, to strip volatiles from the liquid, causing prolonged exposure of the liquid to high temperatures, which affects the coffee aroma, and adds complexity and cost to the process.

Another method is counter-current steam sweeping of the coffee extracts, such as described in US20040026800 where a vapor-liquid contacting column is employed to recover aroma from the coffee extract. Hot air and coffee extract are fed counter-currently to the column which has rotating trays which generate a thin film of liquid to increase surface area in improve liquid-gas mass transfer. While such columns may be effective in improving contact area a mass transfer, they are large, complicated units which pose significant investment and operational costs.

In another known method, designed by the applicant, a coffee extract is heated to a temperature of about 100 to 140° C. and then flashed at ambient pressure, generating a vapor fraction and a stripped liquid fraction. In the flash step, the volatile aroma compounds evaporate into the vapor phase whereby the content of volatile aroma compounds in the stripped liquid fraction is less than in the influent coffee extract. Subsequently the vapor fraction is condensed and distilled to refine and further concentrate the volatile aroma compounds, which are withdrawn in the distillate. While this has proven to work well, the amount of vapor generated is determined by the temperature of the coffee extract, and as high temperatures adversely affect the aroma compounds, the vapor generation and aroma compounds are limited by the temperature of the coffee extract.

Hence, there is still a desire to provide further or improved methods for recovery of coffee aroma which are simple, inexpensive and improves or increases the amount of aroma compounds recovered from the coffee extract.

It is therefore an object of the invention to provide further and improved methods for recovering aroma compounds from coffee extracts which improves on any of the above problems.

SUMMARY OF THE INVENTION

These and further objects are met by a method for recovery of aroma compounds from a coffee extract, the method comprising the steps of:
providing the coffee extract to a two-fluid nozzle;
providing a steam flow to the two-fluid nozzle;
contacting the coffee extract and the steam flow in a mixing zone of the two-fluid nozzle, thereby atomizing the coffee extract to provide a spray;
separating the spray, thereby providing a stripped extract and an aroma rich gas; and
obtaining the aroma rich gas as recovered aroma or further processing the aroma rich gas.

By contacting the coffee extract with the steam-flow using a two-fluid nozzle, the coffee extract is atomized into droplets, resulting in a spray of liquid coffee extract in steam. The aroma compounds are stripped from the coffee extract droplets into the gas phase, aided by the large gas-liquid contact area in the spray and, it is believed, driven by steam distillation of the coffee extract. The applicant has surprisingly found that the short contact time between coffee extract and steam in the spray generated by the two-fluid nozzle is sufficient to strip aroma compounds from the coffee extract. The amount of aroma compounds stripped form the coffee extract is at least at the level of known methods. Hence, when using the two-fluid nozzle there is no need for equipment designed to increase contact time between the two phases, i.e. there is no need for what may be denoted a holding time of the two-phase system. Furthermore, the step of separating the spray may be carried out immediately following the step of generating the spray. The gas phase and the liquid phase of the spray are then separated, providing the aroma rich gas and the stripped extract respectively. The aroma rich gas is then obtained as the recovered aroma, or it may be further processed e.g. to further refine or concentrate the recovered aroma. Obtaining the aroma rich gas as recovered aroma is understood to be the collection of the aroma rich gas.

The spray of coffee extract droplets in steam may also be denoted an aerosol. Using a two-fluid nozzle to atomize and strip aroma compounds from coffee extracts is a cost and space effective solution, as two-fluid nozzles are simple, low-cost units which do not demand large production areas or high utility consumption, while still providing efficient stripping of aroma compounds, i.e. high yield of aroma compounds.

By atomizing the coffee extract with steam using a two-fluid nozzle, the coffee extract does not need to be pre-heated to high temperatures before stripping and the contact time between coffee extract and steam in the spray prior to separation is short, providing a low heat impact on the coffee extract, which may be beneficial for preserving fragile or delicate aroma compounds. Heat impact is here understood as the duration of time the coffee extract is exposed to high temperatures.

Recovery of aroma compounds as used herein is understood to be the separation of aroma compounds from coffee extracts with the purpose of using the recovered aroma for e.g. soluble coffee production. Aroma compounds are understood as volatile components which have an odor and con-tribute to the aroma of coffee. Some of these volatile aroma compounds would typically be lost in commercial soluble coffee production processes such as in extract evaporation steps where the coffee extract is concentrated before drying into a soluble coffee product. Coffee aroma is a complex collection of several organic compounds which provide the aroma of coffee, which can be dependent on the particular coffee bean raw material and the processing thereof. Aroma compounds which may be of interest in coffee production comprise but are not limited to the following furfurylthiol, furfurylmethyl sulfide, dimethyl sulfide, 3-methylbutanal, 2,3-diethyl-5-methylpyrazine, 2-ethyl-3,5-methylpyrazine, 2-ethylpyrazine, trimethylpyrazine, furfural, metional, ethylguaiacol, 2-acetylpyrazine, guaiacol, skatole, vinylguaiacol, 2-phenylethanol, pyridine, 2-acetylpyridine, indole and vanillin.

Coffee extract as used herein is understood to be a liquid obtained from an extraction of coffee beans, such as solid-liquid extraction, solid-gas extraction or condensates of vapors obtained from such extractions. Several different coffee extracts are typically obtained in a soluble coffee production process, such as aroma coffee extracts, hydrolysis coffee extracts and potentially enzymatic coffee extracts. An aroma coffee extract as used herein denotes an extract obtained from coffee beans by extracting at a low temperature, typically 100 to 120° C., whereas hydrolysis coffee extracts are extracts obtained from coffee beans by extracting at higher temperatures, where hydrolysis occurs, typically up to about 190° C. Aroma coffee extracts are denoted as such as this extract typically has a higher content of aroma compounds compared to e.g. the hydrolysis extract. When recovering aroma with the method according to invention, the coffee extract is typically an aroma coffee extract, but other coffee extracts can be used if these are found to have a content of aroma compounds which it is desirable to recover. Such coffee extracts comprise, hydrolysis coffee extracts, enzymatic coffee extracts, and aroma condensates which are obtained by steam stripping coffee beans or by evaporation of a coffee extract. A two-fluid nozzle is a type of nozzle commonly used in the spray-drying industry. Two-fluid nozzles disperse a liquid into fine droplets and create a spray or aerosol, by contacting the liquid with a high-velocity gas. The droplet size in the spray provided by two-fluid nozzles can be less than 100 μm and even less than 10 μm in terms of median particle diameter, d50, on volume basis, as measured by laser diffraction. The achieved atomization depends on the specific construction of the nozzle in question and ratio of atomization gas to feed liquid, type of atomization gas, pressures and properties of the feed liquid, such as viscosity. A two-fluid nozzle is typically installed such that generated spray enters a space which has sufficient volume to accommodate the spray. Generally, a two-fluid nozzle comprises a first channel and a second channel for conducting the liquid and the atomizing gas respectively. The first and second channel are configured such that liquid and gas flowing in the first and second channel respectively are contacted in a mixing zone of the two-fluid nozzle, where the interaction of gas and liquid disperses the liquid to generate the spray or aerosol. Some two-fluid nozzles are denoted as internally mixing as the mixing zone is inside the nozzle and a discharge opening, or openings, of the two-fluid nozzle are provided downstream of the mixing zone. Other two-fluid nozzles are known as externally mixing as the mixing zone is outside of the two-fluid nozzle, e.g. when the outlets of the first channel and the second channel coincide with the discharge opening of the nozzle. Either type can be used in the method, but internally mixing two-fluid nozzles may be preferred at lower steam-to-extract ratios and/or when the extract has a high solid content. Two-fluid nozzles are readily available commercially, and several designs are available. An example of a suitable two-fluid nozzle is disclosed in WO2005061119A1; another example of suitable two-fluid nozzles is the Swirl-Air spray nozzle series from Delavan. It is understood that two-fluid nozzle as used herein denotes an atomization nozzle wherein an atomization gas is used to atomize a liquid feed. Hence, nozzles configured for further fluids can conceivably also be used, such as a three-fluid nozzle which in addition to steam flow and coffee extract is supplied with compressed atomization air.

By separating the spray is understood that the spray, which is composed of liquid droplets dispersed in steam, is allowed to separate into its constituent phases, i.e. a liquid phase and a gas phase, which is then recovered or collected as the stripped extract and aroma rich gas respectively. Various methods for the separation of gas-liquid-mixtures and vapor-liquid separator units are known in the art. A common solution is a separation or flash drum wherein the flow velocity is reduced, allowing the liquid phase to settle as the droplets is not entrained by the gas flow. Another type of vapor-liquid separator unit which may be used are cyclone separators.

The steam flow provided to the two-fluid nozzle is a flow of gaseous water. A steam flow of pure water is presently preferred, as steam is easily condensed and as steam distillation is believed to drive the stripping of aroma compounds at least partly. Conceivably a steam flow comprising further gases can be used, such as a fraction of $N_2$.

Suitably, the coffee extract is provided to the two-fluid nozzle at a temperature in the range of 40 to 140° C. The coffee extract may be preheated in order to provide it a certain temperature. Pre-heating the coffee extract to a higher temperature may increase the yield of stripped aroma compounds from the coffee extract due to a pressure drop at the spray generation causing flash separation. In order to minimize heat impact of a pre-heating of the coffee extract; the holding time of a pre-heated coffee extract prior to atomization should be short, i.e. the length of a flow path of the coffee extract between a pre-heater and the two-fluid nozzle, should be short. A short holding time of the coffee extract in the context of the invention may be in the order of seconds, such as 10 seconds or less. Holding time for the coffee extract can be quantified as the ratio of the length of the flow path and the velocity of coffee flowing therein. The coffee extract may preferably be provided at a temperature at or below 100° C., such as in the range of 40° C. to 100° C., where the change in aroma induced by temperature is low. In some applications pre-heating may be desirable to change the aroma e.g. by pre-heating to a higher temperature of about 140° C. thereby providing a caramelized or burnt aroma, which may be desirable for some consumers.

Suitably the coffee extract has a total solid content of less than 18 w/w %, preferably in the range of 4 to 10 w/w %. Such solid contents are the typical total solid contents in coffee extracts according to the invention. Total solid content is determined as the weight ratio of a sample before and after drying.

Suitably, the steam flow is provided at a pressure in the range of 1 to 5 bara. The pressure of the steam flow affects the atomization of the coffee extract by the two-fluid nozzle, where a higher steam flow pressure reduces the droplet size in the spray, potentially increasing mass transfer, while higher steam pressure also entails higher steam temperatures which may adversely affect the aroma compounds. The pressure of the steam (i.e. gaseous water) flow necessary to achieve sufficient atomization may be different than when using air as the atomization gas as is typical in e.g. spray drying. A steam pressure of about 1 to 5 bara, such as 1, 2, 3, 4 or 5 bara, has been found to efficiently strip aroma compounds from coffee extracts.

The coffee-extract may suitably be provided to the two-fluid nozzle at pressures in the range of 1 to 6 bara, e.g. about 1, 2, 3, 4 or 5 bara. Increasing the pressure at which the coffee extract is provided to the two-fluid nozzle may also improve the atomization of the coffee extract and thus the stripping process. The choice of coffee extract pressure may be affected by the steam flow pressure, e.g. a higher steam flow pressure requiring a higher coffee extract pressure.

Suitably the coffee extract is provided to the two-fluid nozzle at a pressure above the boiling point. For example, a coffee extract provided to the two-fluid nozzle at 100° C. may be provided at a pressure of 2 bara, to avoid boiling the coffee extract.

Alternatively, the coffee extract can be provided at a temperature and pressure at which it boils, thereby providing a steam phase in the coffee extract in the pre-heater, which increases the flow rate, thereby reducing holding time between pre-heater and two-fluid nozzle.

Suitably a steam-extract ratio is at least 2%, preferably in the range of 5 to 30%, more preferably 5 to 15%, the steam-extract ratio being the mass ratio of the steam flow in relation to the coffee extract. I.e. the steam extract ratio is the ratio of the mass flow of the steam flow in relation to the mass flow of the coffee extract.

It has been found that the steam-extract ratio affects the amount of aroma compounds stripped from the coffee extraction, where increasing the amount of steam causes an increase in the amount of aroma compounds being stripped from the extract. The lower limit of the steam-extract ratio may be the amount of steam necessary to provide sufficient atomization of the coffee extract. Increasing the steam-extract ratio increases the amount of aroma compounds stripped from the coffee extract but also provides an aroma rich gas with an increased water content, potentially diluting the aroma rich gas and increasing the utility consumption of subsequent condensation. A steam-extract ratio of at least 2%, preferably in the range of 5 to 30%, more preferably 5 to 15% has been found to provide the desired stripping of aroma compounds. The steam-extract ratio is preferably calculated as the fraction of steam mass flow to coffee extract mass flow, e.g. a steam flow of 8 kg/h and a coffee extract flow of 70 kg/h, provides a steam-extract ratio of about 11.4%. An industrial scale aroma recovery process according to the invention may have a feed flow rate of coffee extract in the range of 700 to 7000 kg/h, and a steam flow rate in the range of 70 to 1400 kg/h. In industrial scale processes several two-fluid nozzles may be provided in a parallel configuration. The skilled person would recognize that the steam-extract ratio can be expressed on basis of other units, such as molar or volume basis.

In this way the method allows for versatile operation as the amount of aroma compounds which are stripped from the extract is affected by the amount of steam provided to the two-fluid nozzle. Hence, the stripping process can easily be adjusted by adjusting the steam flow, in contrast to known flash evaporations where the separation is limited by e.g. the maximum temperature of the coffee extract, due to the adverse effect of high temperature on the aroma compounds.

Suitably, the two-fluid nozzle is an internally mixing two-fluid nozzle. Internally mixing two-fluid nozzles can effectively atomize the coffee extract and strip aroma compounds at lower steam-extract ratios than an externally mixing two-fluid nozzle. An internally mixing nozzle is suitably used for steam-extract ratios of about 2% to 100%, whereas externally mixing two-fluid nozzles may be more suitable for higher steam-extract ratios.

Suitably, the spray is separated in a gas-liquid separator and the aroma rich gas and the stripped extract are recovered from the gas-liquid separator. The gas-liquid separator is a unit in which the spray is allowed to separate in a liquid phase, stripped coffee extract, and a gas phase, aroma rich gas. The stripped extract and aroma rich gas can be withdrawn separately. Typical examples of gas-liquid separators are flash drums or cyclone separators.

Suitably, the coffee extract is atomized directly into the gas-liquid separator. The two-fluid nozzle is advantageously provided such that the spray is generated in the gas-liquid separator. In this way, the holding time of the spray prior to separation is short, contributing to a low heat-impact. Holding time for the spray as used herein is the time period in which the spray is maintained prior to the onset of the separation step. When the spray is generated in the gas-liquid separator, the holding time prior to separation can be said to be a few milliseconds. In practice the coffee extract droplets and the steam will also be in contact in the gas-liquid separator as the gas-liquid separator will have a residence time where the two phases are in contact.

Atomizing the coffee extract directly into the gas-liquid separator may suitably be achieved by a configuration where the two-fluid nozzle or a discharge opening of the two-fluid nozzle is provided in the gas-liquid separator. By having the two-fluid nozzle or the discharge opening thereof placed in the gas-liquid separator, the coffee extract will be atomized directly into the gas-liquid separator and the two phases will be separated therein. The two-fluid nozzle may be configured to spray in a tangential direction into the gas-liquid separator e.g. in case of a cyclone. A two-fluid nozzle configured to spray in a substantially axial direction may also be considered in some applications. Where tangential and axial directions as used here it refers to the geometry of the liquid-separator. Deflector plates may be provided in the gas-liquid separator.

It is understood that by using a two-fluid nozzle to strip aroma compounds from the coffee extract, the invention allows for the separation of aroma rich gas and stripped extract to follow directly after the generation of the spray, as a certain contact time or holding time of the multiphase mixture is not required. Therefore, the two-fluid nozzle can advantageously be provided in the gas-liquid separator, providing a compact unit and with a low heat-impact.

In some applications it may be practical to provide the two-fluid nozzle separately from the gas-liquid separator, with a connecting line provided in between. In such a case it is preferable that the holding time of spray prior to separation is kept short, which in the context of the invention may be in the order of seconds, such as 10 seconds or less.

Suitably the spray downstream of the nozzle is provided at a temperature in the range 60 to 120° C., preferably at about 100° C. and/or at a pressure of 0.2 bara to 2 bara, preferably about 1 bara. The method according to the invention allows for efficient recovery of aroma compounds at these moderate temperature and pressure conditions, even at about 1 bara and 100° C. The pressure and temperature at which the spray is provided is understood to be the conditions prevailing downstream of the two-fluid nozzle.

Suitably the spray is provided at least at ambient pressure. The method according to the invention allows for stripping aroma compound from the coffee extract without the use of vacuum pressures, providing a simple process in terms of equipment and operation. Ambient pressure is understood to be the atmospheric pressure in the surroundings in which the method according to the invention is performed, such that the pressure within and outside of the unit in question is the same.

The spray may be separated at the same conditions as the conditions at which the spray is provided, i.e. the spray may be separated at a temperature in the range 60 to 120° C., preferably at about 100° C. and/or at a pressure of 0.2 bara to 2 bara, preferably about 1 bara. This will be the case when the two-fluid nozzle is provided in the gas-liquid separator in which the spray is separated.

Suitably the aroma rich gas may be further processed, wherein further processing the aroma rich gas comprises:
  distilling the aroma rich gas, thereby providing a distillate and a bottom fraction, the distillate comprising aroma compounds; and
  obtaining the distillate as recovered aroma.

In some applications it may be advantageous to concentrate the aroma rich gas obtained from the spray. This may be achieved by distillation where the distillate is obtained as recovered aroma. The bottom fraction of the distillation will be substantially pure water. The distillate will have a higher concentration of aroma compounds compared to the aroma rich gas, which is advantageous when the recovered aroma is reincorporated into the soluble coffee production as less water will be added along with the recovered aroma. The distillation may be carried out in a conventional distillation unit, which may have a stripping and a rectifying section. The distillation may be performed at ambient pressure, where the distillate is condensed at about 100° C. In some embodiments some of the most volatile aroma compounds will not condense into the distillate, and a further condenser may then be provided to condense these residual aroma compounds at low temperatures, such as 0 to 20° C., preferably about 0 to 5° C., and then this low temperature condensate can be added to the distillate to improve the yield of recovered aroma.

The distillation unit has a reboiler which may comprise a circulation pump, heat exchanger and reboiler chamber. Liquid flowing down through the distillation unit enters the reboiler chamber. A part of the liquid in the reboiler chamber is withdrawn from the reboiler flash chamber as the bottom fraction and another part, denoted a circulation stream, is circulated by the circulation pump to the heat exchanger, whereby the pressure and temperature of the circulation stream is increased. The circulation stream is then flashed into the reboiler chamber, thereby generating vapor. The vapor will flow up through the distillation column from the reboiler chamber to drive the distillation. Other reboiler designs are known to the skilled person. A reflux of part of the distillate back into the distillation unit may be used.

Adjusting the ratio of bottom fraction and/or vapor generated in the reboiler in relation to the feed flow to the distillation unit, i.e. aroma rich gas, can increase the purity of the bottom fraction. A bottom fraction of about 70 to 90% of the feed flow rate to the distillation unit on mass basis may be suitable, such as about 80 to 90%. The reboiler may suitably be set to generate a vapor flow of about 10 to 30% of the feed flow rate to the distillation unit, such as about 10 to 20%, on a mass basis.

The aroma rich gas may suitably be further processed by condensing at least part of the aroma rich gas. Such an intermediate condensation may be performed prior to distilling the aroma rich gas. By partially condensing the aroma rich gas some water can be removed from the aroma rich gas as an intermediate water fraction of substantially pure water. Such an intermediate condensation may in some applications also remove undesirable aroma compounds, i.e. by such undesirable aroma compounds being present in the intermediate water fraction. The intermediate condensation may be performed by cooling to a temperature of 5 to 100° at ambient pressure. A temperature of 80° C. for the intermediate condensation may be suitable for removing water from the aroma rich gas. The aroma rich gas can also be condensed to provide recovered aroma in liquid form, e.g. by condensing at low temperatures such as below 20° C., e.g. at 15° C. Recovered aroma in liquid form is in this context understood to be a mixture of water and aroma compounds in liquid state. A plurality of condensation stages at sequentially lower temperatures may be used to first remove water and subsequently to provide recovered aroma in liquid form.

Suitably the stripped extract is further processed to a soluble coffee product, and the recovered aroma is incorporated in the soluble coffee product. Following the separation of the spray, the stripped extract is further processed to provide a soluble coffee product. This may comprise concentrating the stripped coffee extract to obtain a concentrated coffee extract, optionally by vacuum evaporation, and spray drying or freeze drying the concentrated coffee extract to provide the soluble coffee product. The recovered aroma is incorporated into soluble coffee product by adding it to the concentrated coffee extract prior to spray or freeze drying or to the soluble coffee product.

The recovered aroma as obtained by a method according to the invention can also be added to other coffee products, such as liquid coffee products, to improve the aroma compound content. Liquid coffee products could be a liquid coffee concentrate.

The invention also provides a system for recovering aroma compounds from a coffee extract, the system comprising:
- a gas-liquid separator having a liquid outlet and a gas outlet;
- a two-fluid nozzle configured for generating a spray into the gas-liquid separator;
- wherein the two-fluid nozzle comprises a first channel and a second channel, the first and second channel being in fluid communication at a mixing zone of the two-fluid nozzle,
- and the first channel is connected to a supply of coffee extract and the second channel is connected to a supply of steam.

By providing a gas-liquid separator with a liquid outlet and a gas outlet, and a two-fluid nozzle configured for generating a spray in the gas-liquid separator, the system is configured for performing the method according to the invention. A liquid outlet is an outlet configured for withdrawing liquid from the gas-liquid separator. The liquid outlet may be connected to a pump for withdrawing liquid from the gas-liquid separator.

Suitably the system further comprises:
- optionally an intermediate condenser in fluid communication with the gas outlet of the gas-liquid separator;
- a distillation unit having a feed inlet, a distillate outlet and a bottoms outlet, the feed inlet being in fluid communication with the gas outlet of the gas-liquid separator, optionally via the intermediate condenser.

Such a system is configured for performing a method according to the invention, wherein the aroma rich gas recovered from the gas-liquid separator is further processed by distillation. The invention also provides a method for producing a soluble coffee product from coffee beans, comprising the steps of:
- providing a coffee extract;
- recovering aroma compounds from the coffee extract using a method for recovery of aroma compounds as disclosed herein, thereby providing recovered aroma and stripped coffee extract;
- concentrating the stripped coffee extract by evaporation of water, thereby providing a concentrated coffee extract;
- adding the recovered aroma to concentrated coffee extract;
- spray drying or freeze drying the concentrated coffee extract to obtain the soluble coffee product.

The invention also provides the use of a two-fluid nozzle for recovery of aroma compounds from a coffee extract, and further wherein the use is as detailed herein above.

The details of how to perform steps of concentrating the stripped coffee extract and the step of spray drying or freeze drying the concentrated coffee extract are known to the skilled person.

DETAILED DESCRIPTION

In the following the invention will be described with reference to the exemplary embodiments shown in the figures, where FIG. 1 shows a process for recovering aroma compounds according to the invention;

Figure 1:
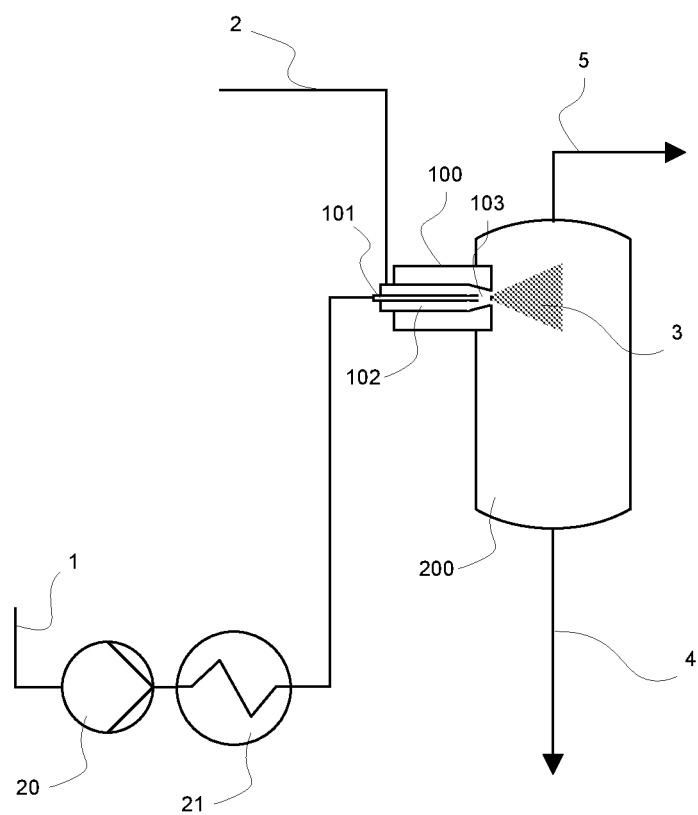

FIG. 1 shows a process scheme of an embodiment of the invention, wherein the aroma compounds are recovered from a coffee extract 1. Not all the equipment and instrumentation which may be part of the process is shown. The coffee extract 1 is provided to the two-fluid nozzle 100 by way of pump 20. A heat exchanger 21 is provided to pre-heat the coffee extract 1, this pre-heating is optional but shown for illustration. The coffee extract 1 is supplied to a first channel 101 of the two-fluid nozzle and a steam flow 2 is provided to a second channel 102 of the two-fluid nozzle. The two-fluid nozzle 100 is here shown in a schematic manner and is in this embodiment an internally mixing two-fluid nozzle, hence a mixing zone 103 is provided within the two-fluid nozzle. The coffee-extract 1 and steam flow 2 are contacted in the mixing zone 103 whereby the coffee extract is atomized to provide a spray 3 of coffee extract droplets in steam. The two-fluid nozzle 100 sprays directly into a gas-liquid separator 200, which is here shown as a flash chamber. Upon atomization, aroma compounds are stripped from the coffee extract droplets into the gas phase. In the gas-liquid separator 200, the flow velocity is such that the liquid droplets of the spray 3 are allowed to settle and a stripped coffee extract 4 is recovered, i.e. withdrawn, from the bottom of the gas-liquid separator 200, e.g. by way of a pump (not shown). The gas phase of the gas-liquid separator 200 is recovered, i.e. withdrawn, as an aroma rich gas 5. In the conventional manner a demister (not shown) may be provided in or in conjunction with the gas-liquid separator 200 to catch small droplets entrained in the gas phase. The stripped coffee extract 4 has a lower content of aroma compounds than the coffee extract 1. The aroma rich gas 5 is obtained as recovered aroma.

Figure 2:
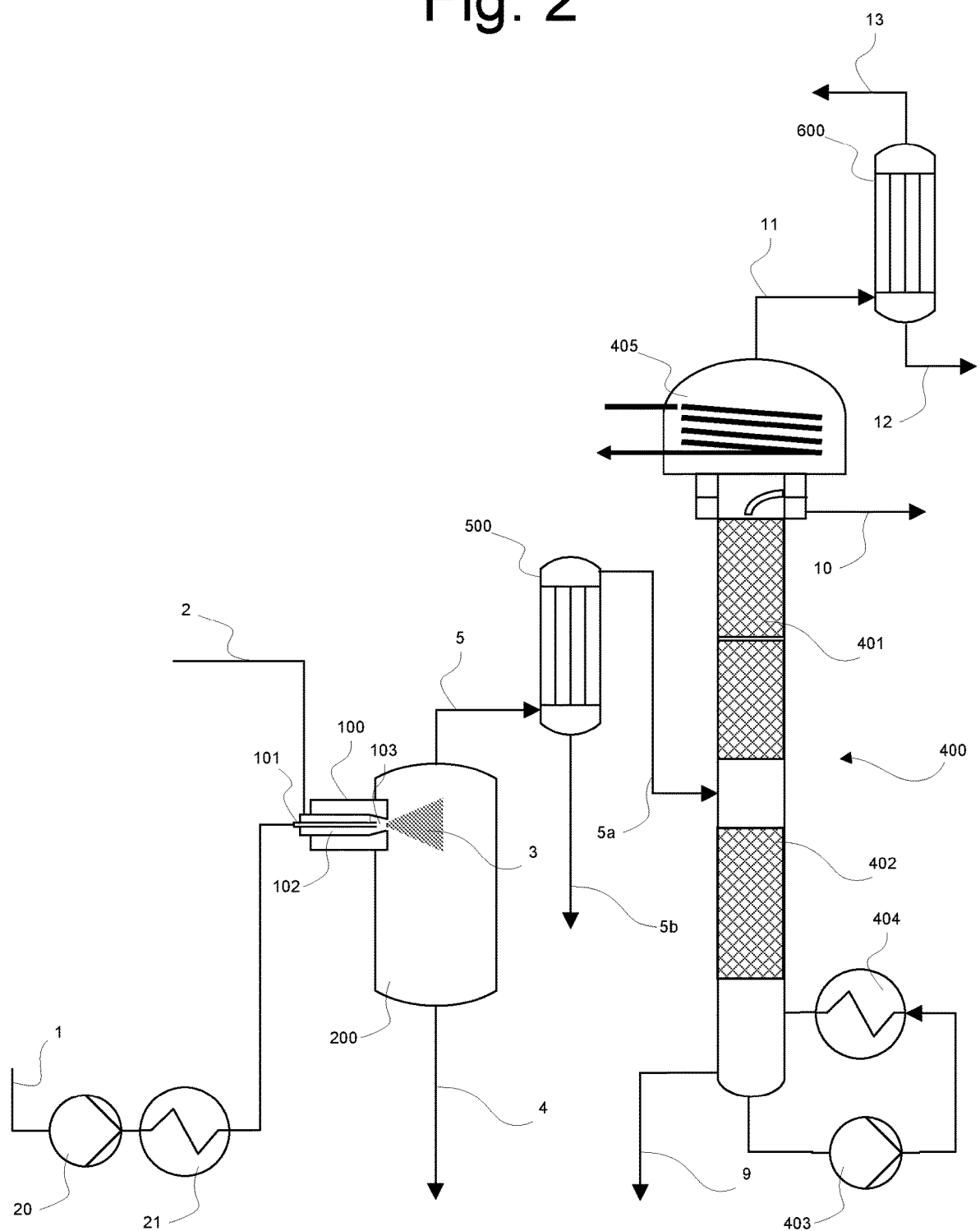
FIG. 2 shows another embodiment of the process for recovering aroma compounds, where the aroma rich gas is further processed by distillation.

FIG. 2 shows a development of the embodiment of FIG. 1 wherein the recovered aroma in the aroma rich gas 5 is further processed by refining and concentrating it in a distillation column 400. Prior to distillation the aroma rich gas 5 is partly condensed to remove water in intermediate condenser 500 yielding a concentrated aroma rich gas 5a and intermediate condensate 5b. The intermediate condenser condenses the aroma rich gas 5 by cooling with cooling water (not shown). The concentrated aroma rich gas 5a is fed to distillation column 400 at a position in between a rectifying section 401 and a stripping section 402 of the distillation column. The distillation column 400 has a reboiler which is here a heater 404 and a circulation pump 403. The circulation pump 403 increases the pressure and pumps the liquid to the heater 404 where it is heated. The liquid is then flashed into the distillation column, e.g. by a flash valve (not shown), generating vapor which rises into the stripping section 402. A bottom fraction 9 is withdrawn from the distillation column consisting of water or substantially of water. The gas flow from the rectifying section is condensed by cooler 405 to provide a distillate which is partly refluxed back into the distillation unit and partly withdrawn as distillate 10. The reflux is here provided by a liquid overflow from the liquid collected in the cooler 405. The distillate 10 contains the recovered aroma. In the embodiment of FIG. 2, a further condenser 600 is provided to condense any volatiles not condensed into the distillate. Hence, the top gas fraction 11 is condensed in condenser 600 to provide a top gas condensate 12 and the off-gas 13. The condenser 600 may use a coolant at about 0° C. to condense aroma compounds not condensed by cooler 405. The top gas condensate 12 contains recovered aroma compounds and water and may be added to distillate 10.

Figure 3:
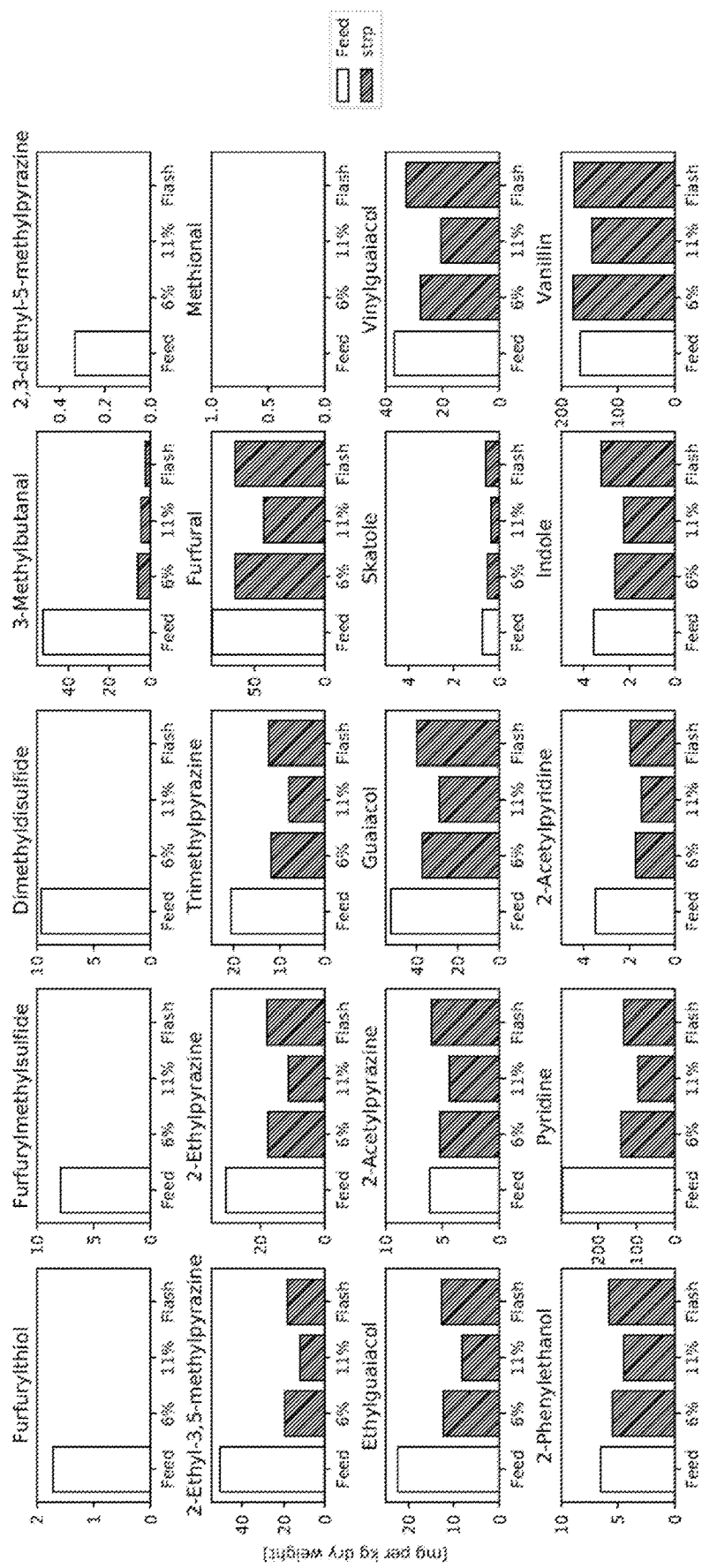
FIG. 3 shows the content of selected aroma compounds in a process as shown in FIG. 2 compared to a known method.

FIG. 3 shows the result of GC-MS analysis of select aroma compounds in the feed coffee extract and stripped coffee extract of Example I.

Figure 4:
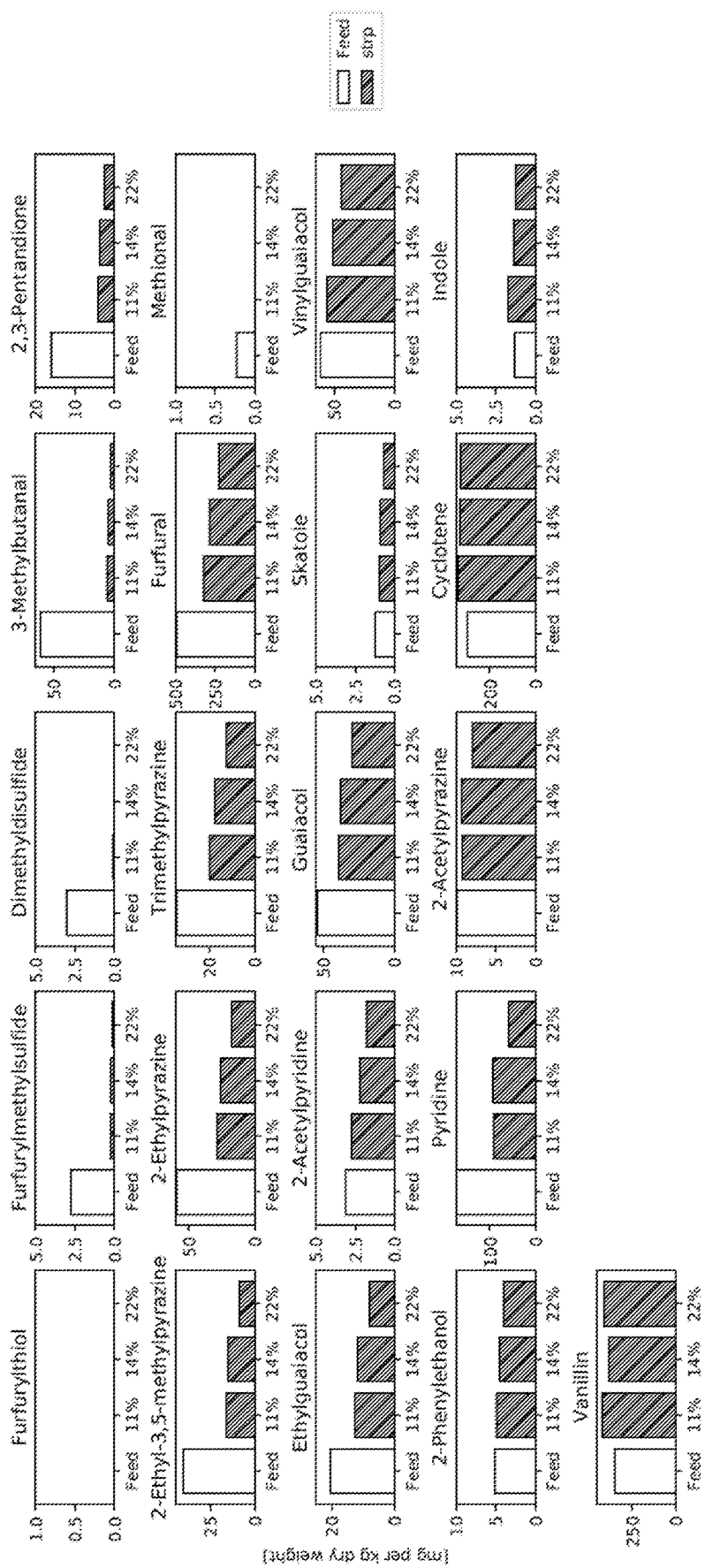
FIG. 4 shows the content of selected aroma compounds in a process as shown in FIG. 2 at selected steam-extract ratios.

FIG. 4 shows the result of GC-MS analysis of select aroma compounds in in the feed coffee extract and stripped coffee extract of Example II.

Figure 5:
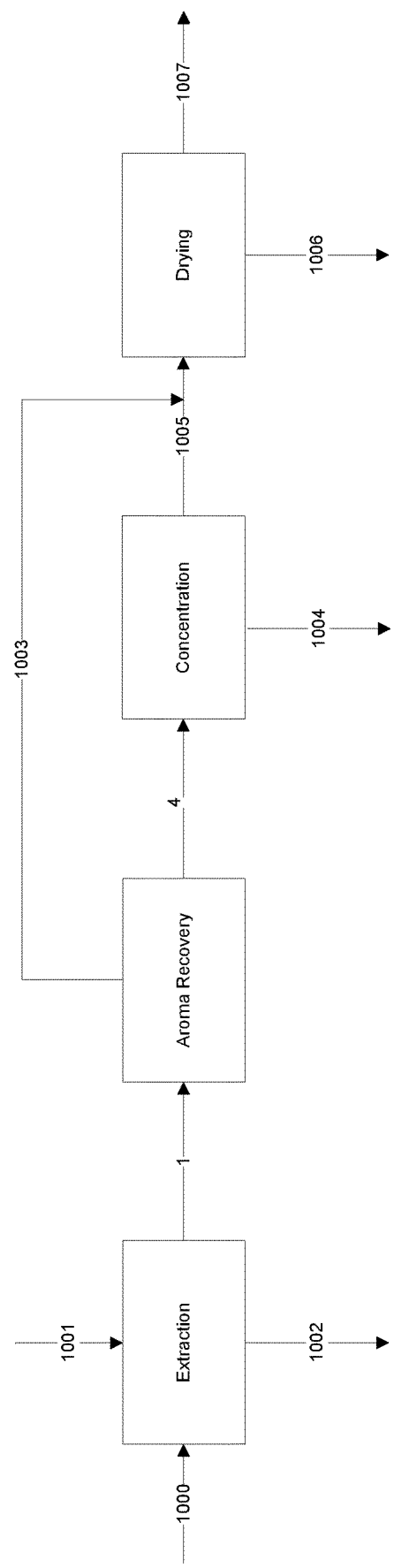
FIG. 5 shows a flow diagram of a soluble coffee production process wherein aroma is recovered.

FIG. 5 shows a flow chart of a soluble coffee production process where aroma is recovered according to the invention. The process has four steps, extraction, aroma recovery, extract concentration and drying. In the initial extraction step, ground coffee beans 1000 is extracted with water 1001 yielding coffee extract 1 and extracted coffee bean material 1002. The extraction process may be several separate extraction steps at different temperatures. The coffee extract 1 is led to an aroma recovery process according to the invention, which yields stripped extract 4 and recovered aroma 1003. The stripped extract is led to a concentration step where water is removed from the stripped coffee extract to provide concentrated coffee extract 1005 and water vapor stream 1004. The concentration is typically an evaporation optionally at vacuum pressure, which in addition to water would also remove aroma compounds had these not been recovered in the preceding step. The recovered aroma 1003 is the incorporated into the concentrated coffee extract 1005 and the resulting mixture is led to a drying step, typically spray drying or freeze drying, yielding soluble coffee product 1007 and water vapor stream 1006.

Example I—Two-Fluid Nozzle Compared to Ambient Flash

Volatile aroma compounds were recovered according to an embodiment of the invention using a process as shown in FIG. 2 at two select steam-extract ratios 6% and 11%. A comparative example was performed as an aroma recovery process using a flash separation of the coffee extract for comparison.

Aroma was recovered from aroma coffee extract with 7% total solids (TS) concentration in a process as shown in FIG. 2. The aroma coffee extract was pumped at a rate of 70 kg/h and 3 barg to the preheater where it was heated to 98° C. From the preheater the coffee extract was led to a Delavan Swirl-Air SL-1 two-fluid nozzle and mixed with saturated steam at a rate of 4 kg/h (steam-extract ratio of 6%) and sprayed into the flash chamber. The stripped coffee extract was pumped out of the bottom of the flash chamber and the vapors, i.e. the aroma rich gas, was fed to the distillation column at a feeding point between the stripper and rectifier section. The rectifier section was approximately 80 cm in length and 50 mm in diameter and equipped with stainless steel wool. The stripper section was approximately 60 cm long and 30 mm in diameter and was also equipped with stainless steel wool. The reboiler was set to evaporate 1 kg/h water, the excess bottom fraction was overflowing at a rate of about 3 kg/h. The vapors from the rectifier section were condensed in a water-cooled tubular heat exchanger, and about 0.7 kg/h of distillate was withdrawn, and the remainder was refluxed to the distillation column. Samples were taken simultaneously of feed aroma coffee extract, the stripped coffee extract, the distillate and the bottom fraction and the samples were analyzed by GC-MS.

For the second experiment at 11% steam-extract ratio, the same procedure was repeated with a steam flow of 8 kg/h.

For the comparative flash experiment the same setup and conditions were used, but the steam supply to the two-fluid nozzle was shut off and the feed was pre-heated to 140° C. and a pressure well above the boiling point. 140° C. is typically the maximum temperature at which a flash process would be conducted so as not to adversely affect the aroma of the coffee to an unacceptable degree. The pressure in the flash chamber was the ambient pressure, and as a result the coffee extract was flashed generating approximately 5 kg of vapor composed of steam and volatiles. The generated vapor was further processed and analyzed as above. The 5 kg of vapor corresponds to about 7% of the feed, compared to the 4 and 8 kg/h of steam corresponding to steam-extract ratios of 6 and 11% respectively.

The GC-MS results for select aroma compounds in the feed aroma coffee extract and stripped coffee extract are shown in FIG. 3 where the unit is mg aroma compound per kg dissolved solids in the feed coffee extract. The results are arranged by volatility, the top left being the most volatile and the bottom right being the least volatile compound.

As can be seen the amount of aroma stripped from the coffee extract, as indicated by the residual amount in the stripped coffee extract, increases with the amount of steam supplied. A 6% steam-to-extract ratio strips approximately the same amount from the coffee extract as the flash separation whereas increasing the steam amount to 11% increases the amount of aroma stripped from the coffee extract.

Thus, the method according to the invention can achieve at least the same amount of the stripped aroma compound as the flash process, without heating the coffee extract above 100° C.

Example II—Steam-Extract Ratios

A series of experiments was performed according to the same procedure and setup as in Example I using another aroma coffee extract than the one in Example I and using steam-extract ratios of 11%, 14% and 22% respectively.

For the experiment at 11% steam-extract ratio, aroma was recovered from aroma coffee extract with 7% total solid (TS) concentration. The coffee extract was pumped at a rate of 70 kg/h and 3 barg to the preheater and heated to 98° C. From the preheater the coffee extract was led to a Delavan Swirl-Air SL-1 two-fluid nozzle and mixed with saturated steam at a rate of 8 kg/h (steam-extract ratio of 11%) and sprayed into the flash chamber. The stripped coffee extract was pumped out of the bottom of the flash chamber and the vapors, i.e. the aroma rich gas, were fed to the distillation column. The reboiler was set to evaporate 1 kg/h water, the excess bottom fraction was overflowing at a rate of about 7 kg/h. The vapors from the rectifier section were condensed in a water-cooled tubular heat exchanger and about 0.7 kg/h of distillate was withdrawn, and the remainder was refluxed to the column. Samples were taken simultaneously of feed coffee extract, the stripped coffee extract, the distillate and the bottom fraction and the samples were analyzed by GC-MS.

For the experiments at 14 and 22% steam-extract ratios the same procedure was repeated with steam flows of 10 and 16 kg/h respectively.

The GC-MS results for select aroma compounds in the feed aroma coffee extract and stripped coffee extract are shown in FIG. 4 where the unit is mg aroma compound per kg dissolved solids in the feed coffee extract. The results are arranged by volatility the top left being the most volatile and the bottom right being the least volatile compound.

As can be seen the amount of aroma stripped from the coffee extract, as indicated by the residual amount in the stripped coffee extract, increases with the amount of steam supplied.

It is noted that the results of Examples I and II should be read by comparing the content of the stripped coffee extract to the content of the feed and the Examples cannot necessarily be compared to each other, as the feed coffee extracts were different in the two Examples.

What is claimed is:

1. A method for recovery of aroma compounds from a coffee extract, the method comprising:
    providing the coffee extract to a two-fluid nozzle;
    providing a steam flow to the two-fluid nozzle;
    contacting the coffee extract and the steam flow in a mixing zone of the two-fluid nozzle, thereby atomizing the coffee extract to provide a spray;
    separating the spray, thereby providing a stripped coffee extract and an aroma rich gas; and
    obtaining the aroma rich gas as recovered aroma or further processing the aroma rich gas.

2. A method according to claim 1, wherein the coffee extract is provided to the two-fluid nozzle at a temperature in the range of 40 to 140° C.

3. A method according to claim 1, wherein the coffee extract has a total solid content of less than 18 w/w %.

4. A method according to claim 1, wherein the steam flow is provided at a pressure in the range of 1 to 5 bara.

5. A method according to claim 1, wherein a steam-extract ratio is at least 2%, the steam-extract ratio being the mass ratio of the steam flow in relation to the coffee extract.

6. A method according to claim 1, wherein the spray is separated in a gas-liquid separator and the aroma rich gas and the stripped extract are recovered from the gas-liquid separator.

7. A method according to claim 6, wherein the coffee extract is atomized directly into the gas-liquid separator.

8. A method according to claim 6, wherein the two-fluid nozzle or a discharge opening of the two-fluid nozzle is provided in the gas-liquid separator.

9. A method according to claim 1, wherein the spray downstream of the nozzle is provided at one or more of a temperature in the range 60 to 120° C. or a pressure of 0.2 bara to 2 bara.

10. A method according to claim 1, wherein the spray is separated at one or more of a temperature in the range 60 to 120° C. or a pressure of 0.2 bara to 2 bara.

11. A method according to claim 1, wherein further processing the aroma rich gas comprises:
    distilling the aroma rich gas, thereby providing a distillate and a bottom fraction, the distillate comprising aroma compounds; and
    obtaining the distillate as recovered aroma.

12. A method according to claim 1, wherein the stripped extract is further processed to a soluble coffee product, and the recovered aroma is incorporated in the soluble coffee product.

13. A system for recovering aroma compounds from a coffee extract, the system comprising:
    a gas-liquid separator having a liquid outlet and a gas outlet; and
    a two-fluid nozzle configured for generating a spray into the gas-liquid separator;
    wherein the two-fluid nozzle comprises a first channel and a second channel, the first and second channel being in fluid communication at a mixing zone of the two-fluid nozzle, and the first channel is connected to a supply of coffee extract and the second channel is connected to a supply of steam.

14. A system according to claim 13, further comprising:
    optionally an intermediate condenser in fluid communication with the gas outlet of the gas-liquid separator; and
    a distillation unit having a feed inlet, a distillate outlet and a bottoms outlet, the feed inlet being in fluid communication with the gas outlet of the gas-liquid separator, optionally via the intermediate condenser.

15. A method for producing a soluble coffee product from coffee beans, the method comprising:
    providing a coffee extract;
    providing the coffee extract to a two-fluid nozzle;
    providing a steam flow to the two-fluid nozzle;
    contacting the coffee extract and the steam flow in a mixing zone of the two-fluid nozzle, thereby atomizing the coffee extract to provide a spray;
    separating the spray, thereby providing a stripped coffee extract and an aroma rich gas;
    obtaining the aroma rich gas as recovered aroma or further processing the aroma rich gas;
    concentrating the stripped coffee extract by evaporation of water, thereby providing a concentrated coffee extract;
    adding the recovered aroma to the concentrated coffee extract; and
    spray drying or freeze drying the concentrated coffee extract to obtain the soluble coffee product.

16. The method of claim 3, wherein the coffee extract has a total solid content in the range of 4 to 10 w/w %.

17. The method of claim 5, wherein the steam-extract ratio is in the range of 5 to 30%.

18. The method of claim 17, wherein the steam-extract ratio is in the range of 5 to 15%.

19. The method of claim 9, wherein the spray downstream of the nozzle is provided at one or more of a temperature at about 100° C. or a pressure of about 1 bara.

20. The method of claim 10, wherein the spray is separated at one or more of a temperature at about 100° C. or a pressure of about 1 bara.

* * * * *